(12) United States Patent
Baker et al.

(10) Patent No.: US 6,612,597 B2
(45) Date of Patent: Sep. 2, 2003

(54) TANDEM BICYCLE ADAPTER

(76) Inventors: Orlando C. Baker, 1801 Sylvan Dr., Austin, TX (US) 78741; Francis H. Schaefer, IV, 1801 Sylvan Dr., Austin, TX (US) 78741

(*) Notice: Subject to any disclaimer, the term of this patent is extended or adjusted under 35 U.S.C. 154(b) by 0 days.

(21) Appl. No.: 10/238,166

(22) Filed: Sep. 10, 2002

(65) Prior Publication Data

US 2003/0057672 A1 Mar. 27, 2003

Related U.S. Application Data

(60) Provisional application No. 60/324,326, filed on Sep. 24, 2001.

(51) Int. Cl.[7] ............................ B62K 13/02; B62M 1/02
(52) U.S. Cl. ...................... 280/204; 280/231; 280/259; 280/287
(58) Field of Search ................... 280/204, 231, 280/239, 278, 287, 292, 30, 259, 7.16

(56) References Cited

U.S. PATENT DOCUMENTS

| | | | | |
|---|---|---|---|---|
| 516,435 | A | * | 3/1894 | Hasbrouk .................. 280/7.16 |
| 551,848 | A | * | 12/1895 | Bryant ...................... 280/7.16 |
| 552,907 | A | * | 1/1896 | Jakobson .................. 280/7.16 |
| 599,152 | A | | 2/1898 | Schluer |
| 625,612 | A | | 5/1899 | Sternberg |
| 628,843 | A | * | 7/1899 | Pedersen .................... 280/231 |
| 1,428,496 | A | * | 9/1922 | Roquefort-Villeneuve .. 280/278 |
| 3,680,879 | A | | 8/1972 | Cogliano |
| 4,458,908 | A | | 7/1984 | Strong |
| 4,600,206 | A | | 7/1986 | Di Paolo |
| 4,995,626 | A | | 2/1991 | Montague |
| 5,209,507 | A | | 5/1993 | Domenge |
| 5,372,371 | A | | 12/1994 | Larson |
| 5,716,065 | A | * | 2/1998 | Liu ............................ 280/204 |
| 5,810,379 | A | | 9/1998 | Shusterman |
| 5,860,662 | A | | 1/1999 | Bartoshesky |
| 6,024,368 | A | * | 2/2000 | Balajadia .................... 280/239 |
| 6,092,820 | A | | 7/2000 | Evans |
| 6,352,131 | B1 | | 3/2002 | Lin |

FOREIGN PATENT DOCUMENTS

GB 2267469 * 12/1993

* cited by examiner

Primary Examiner—Anne Marie Boehler
(74) Attorney, Agent, or Firm—John V. Stewart

(57) ABSTRACT

A tandem adapter frame that attaches to the back of a single-rider bicycle, transforming the bicycle into a tandem bicycle. The rear wheel of the single-rider bicycle is removed from the bicycle and installed on the back end of the adapter frame. The adapter frame is attached to the single-rider bicycle at the seat post and the rear dropouts, resulting in a rigid 3-point connection. This transforms the single-rider bicycle into a rigid frame, two wheel, tandem bicycle with a rider in front and a rider in back. Both riders have pedals. An adapter axle assembly with sprockets on the lower front of the adapter frame serves two functions. It easily attaches between the rear dropouts of the single-rider bicycle using a standard axle and quick-release, and it transmits drive power to the rear crank without modifying the drive chain of the single-rider bicycle.

5 Claims, 7 Drawing Sheets

TANDEM BICYCLE ADAPTER

CROSS-REFERENCE TO RELATED APPLICATIONS

This application claims the benefit of provisional patent application No. 60/324326, Sep. 24, 2001.

BACKGROUND OF THE INVENTION

1. Field of the Invention

This invention relates to devices for converting a standard bicycle into a tandem bicycle.

2. Description of Prior Art

Tandem bicycles provide bonding between the captain (front rider) and the stoker (back rider), and are an enjoyable alternative to riding separate bicycles or children riding in bicycle seats. Also, a tandem bicycle safely teaches children how to ride a bicycle while an older rider maintains control. However, tandem bicycles are hard to store and transport and expensive, so attempts have been made to provide conversion kits for standard bicycles, or specialized frames that convert between single and dual rider bicycles.

However, existing products that adapt single-rider bicycles into tandem bicycle have one or more of the following problems:

a. The conversion frame pivots on the bicycle. This makes the combined frames unstable and difficult to steer. It is usually not strong enough to support an adult in the rear position.

b. Two bicycles are attached yielding a three or four-wheel tandem bicycle that is cumbersome, inefficient, and hard to maneuver.

c. The attached device acts more as a trailer.

d. The stoker is not required to pedal which means less participation/interaction between captain and stoker.

e. The stoker device only attaches at a single point, such as the seat post, yielding an unstable tandem bicycle that will yaw.

f. The whole frame is fully specialized for conversion to and from a single rider configuration, rather than using a standard bicycle. This is expensive.

SUMMARY OF THE INVENTION

The objectives of the present invention are to solve the above problems as follows:

1. Versatility. Provide a tandem adapter that attaches to a standard bicycle for a tandem ride, or left off for a solo ride.

2. Adjustability. Provide a tandem adapter that easily adjusts to fit a variety of bicycle frame sizes.

3. Ease of attachment and detachment. Provide a tandem adapter that can be setup by a person skilled in the art of bicycles, and then is easy to attach and detach by persons not skilled in the art.

4. Cost. Provide a tandem adapter that is a comparatively inexpensive alternative to owning both a single-rider bicycle and a tandem bicycle.

5. Storage. Provide a tandem adapter that requires less space than owning a single bicycle and a tandem bicycle.

6. Transportation. Provide a tandem adapter that allows single rider bicycles to be transported via standard bicycle racks. Attachment of tandem adapter takes place at destination.

These objectives are achieved by providing a tandem adapter frame that attaches to the back of a single-rider bicycle, transforming the bicycle into a tandem bicycle. The rear wheel of the single-rider bicycle is removed and the tandem adapter is attached to the single-rider bicycle at the seat post and the rear drop-outs, resulting in a highly rigid 3-point connection. The rear wheel is then mounted on the rear of the tandem adapter, transforming the single-rider bicycle into a rigid frame, two wheel, tandem bicycle with a rider in front (captain) and a rider in back (stoker). Both riders have pedals. An adapter axle assembly with sprockets on the lower front of the adapter frame serves two functions. It easily attaches between the rear dropouts of the single-rider bicycle using a standard axle and quick-release, and it transmits drive power to the rear crank without modifying the drive chain of the single-rider bicycle.

REFERENCE NUMBERS

Figure 1:
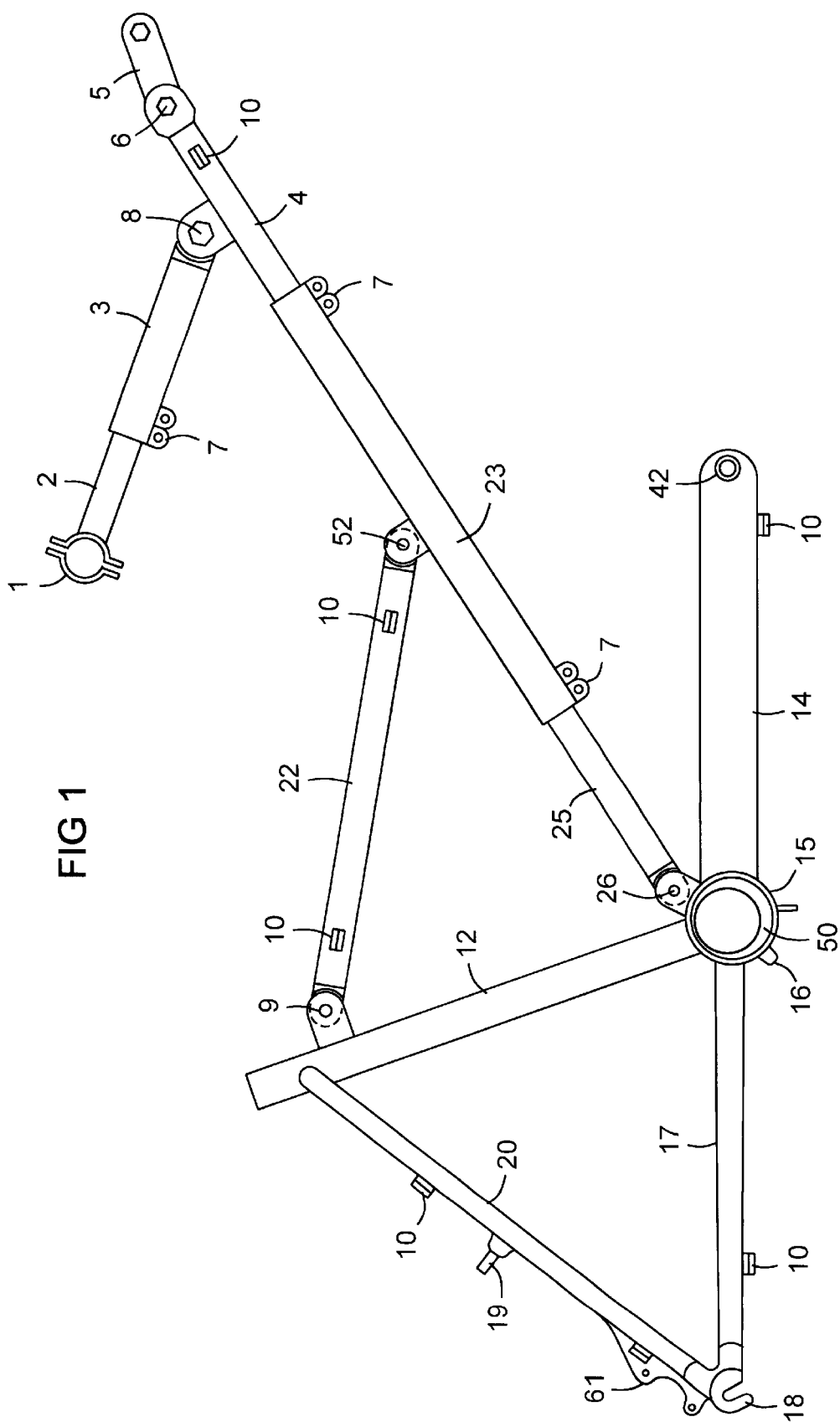
FIG. 1 is a side view of a preferred embodiment of the tandem adapter frame.
Figure 2:
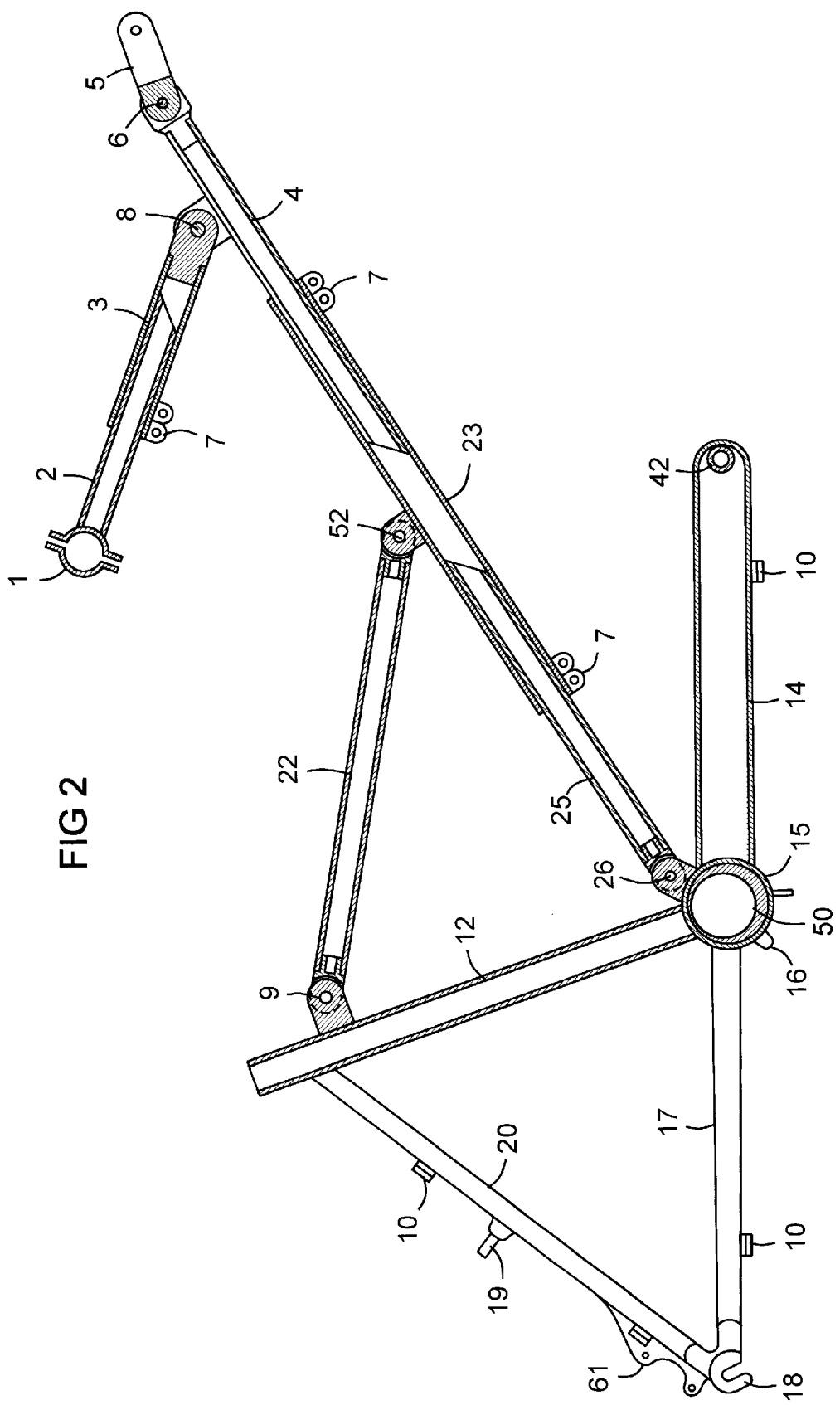
FIG. 2 is a side sectional view of FIG. 1.

1. Handle bar clamp
2. Telescoping tube of handle bar stem
3. Handle bar stem
4. Top tube telescoping tube
5. Captain's seat post clamp
6. Seat post clamp pivot
7. Pinch bolts
8. Handle bar stem pivot
9. Seat tube pivot
10. Cable stops
11. Bent top tube
12. Seat tube
13. Axle assembly
14. Boom tube
15. Bottom bracket shell
16. Set screw
17. Chain stay
18. Rear drop out of adapter frame
19. Brake boss
20. Seat stays
21. Captain's rear drop outs
22. Top tube brace
23. Braced top tube
25. Bottom bracket top tube telescoping tube
26. Top tube pivot
27. Cable quick-connect coupling
28. Tandem adapter brake cable
29. Tandem adapter handle bar
30. Tandem adapter brake
31. Rear wheel
32. Captain's rear brake cable
33. Captain's seat post 34. Captain's chain
35. Captain's crank set
36. Captain's rear derailleur
37. Tandem adapter derailleur cable
38. Axle assembly chain
39. Tandem adapter crank set
40. Tandem adapter chain
41. Tandem adapter derailleur
42. Axle assembly housing
43. Exterior threaded hollow axle
44. Sprocket hub
45. Fixed sprocket
46. Sprocket spacer
47. Free wheel sprocket
48. Threaded axle spacer
49. Quick release skewer
50. Eccentric bottom bracket holder
51. Captain's rear derailleur cable
52. Brace pivot
53. Gear cluster
54. Sprocket hub tightener
55. Tandem adapter seat post
56. Freewheel pawl mechanism
57. Captain's top tube
58. Captain's down tube
59. Captain's chain stay
60. Captain's seat stay
61. Optional disk brake bracket

TERMINOLOGY

Captain: The front rider on a tandem bicycle.
Stoker: The back rider on a tandem bicycle.
Drop-out: A wheel axle mounting plate with an open-ended slot to receive an axle.

DETAILED DESCRIPTION

FIG. 1 is a side view of the drive train side of the tandem adapter frame constructed in accordance with the invention. The rear triangle, like that of a regular bicycle, is constructed of a seat tube 12, chain stays 17, rear drop outs 18, seat stays 20, brake bosses 19, a bottom bracket shell 15, and cable stops 10. A telescoping top tube assembly extends upward and forward from the bottom bracket shell. The top tube assembly preferably comprises a top tube pivot 26, a bottom bracket top tube telescoping tube 25, a braced top tube 23 with pinch bolts 7 on both ends, a top tube telescoping tube 4, a seat post clamp pivot 6, and a captain's seat post clamp 5, and a top tube brace 22. The top tube brace spans between the seat tube 12 and the braced top tube 23, with pivots 9, 52 at both ends of the top tube brace. Other tube configurations may be used for the top tube assembly. A boom tube 14 extends forward from the bottom bracket shell. An adapter axle assembly housing 42 is attached to the front end of the boom tube. An eccentric bottom bracket holder 50 is mounted rotatably in the bottom bracket shell, and is locked in place by a set screw 16. A handle bar stem 3 is attached to the top tube telescoping tube via a handle bar stem pivot 8 that allows the handle bar stem to adjust rotationally. The handle bar stem accepts a telescoping tube section 2 that terminates in a handle bar clamp 1.

Figure 3:
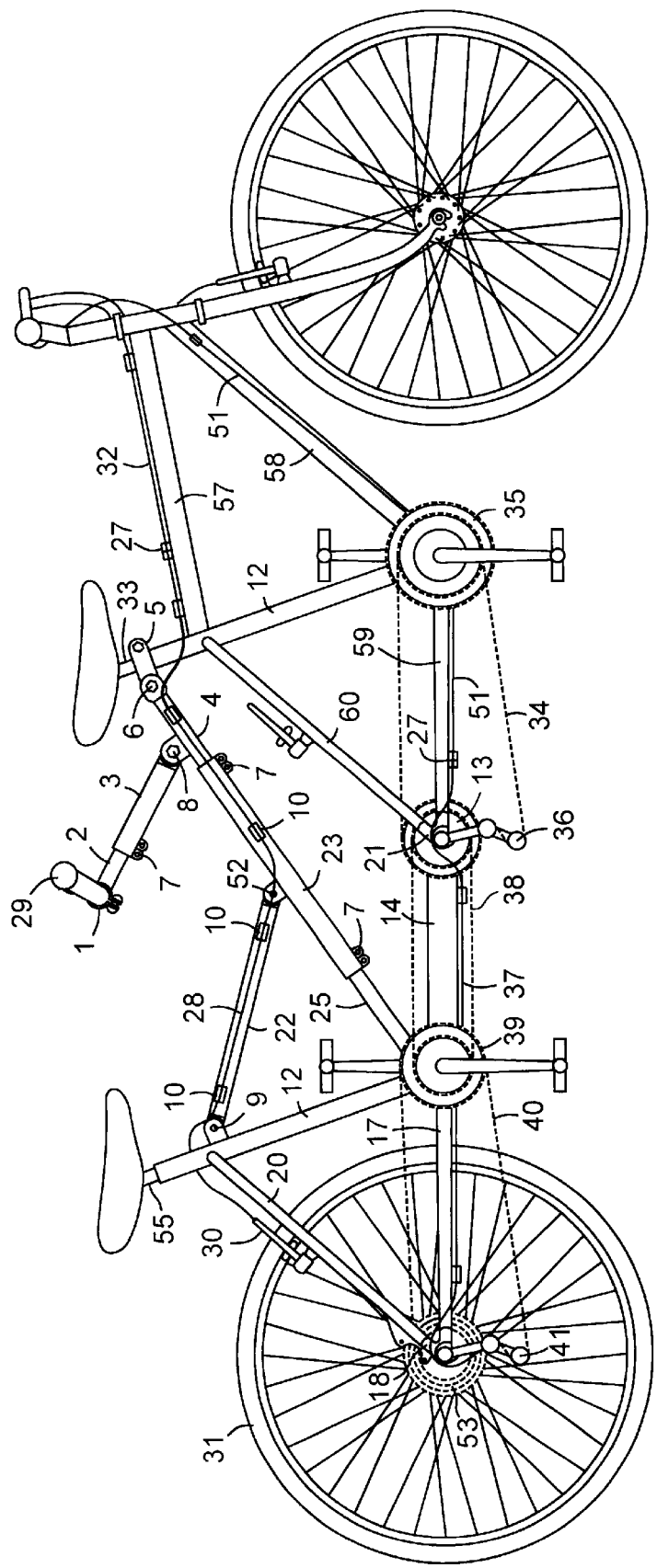
FIG. 3 is a side view of a tandem adapter attached to a bicycle to create a rigid tandem bicycle.

FIG. 3 is a view of the drive train side of the tandem adapter attached to a standard bicycle. The points of connection are the seat post of the standard bicycle and the two rear drop-outs of the standard bicycle. This 3-point connection provides both lateral and vertical rigidity to the resulting tandem bicycle frame. Both degrees of rigidity are needed for stable efficient tandem pedaling and steering. The standard bicycle frame becomes the forward, or captain's section of a tandem bicycle. A seat post clamp 5 on the front end of the tandem adapter top tube 4 clamps onto the captain's seat post 33. An adapter axle assembly 13 on the lower front end of the adapter frame attaches to the captain's rear drop outs 21 by means of a standard bicycle axle 43 and a standard quick-release axle fastener 49.

Figure 4:
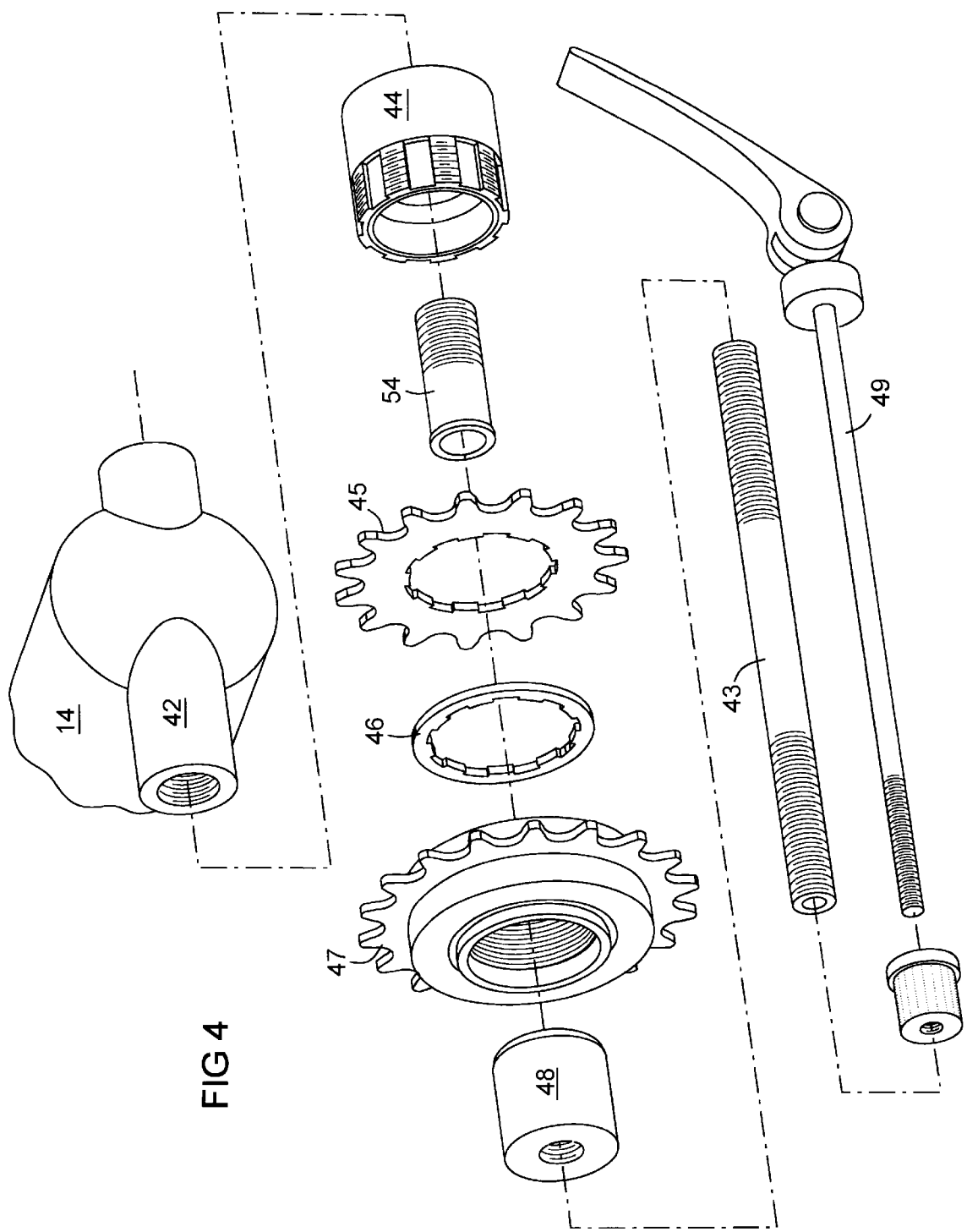
FIG. 4 is an exploded view of the adapter axle assembly
Figure 5:
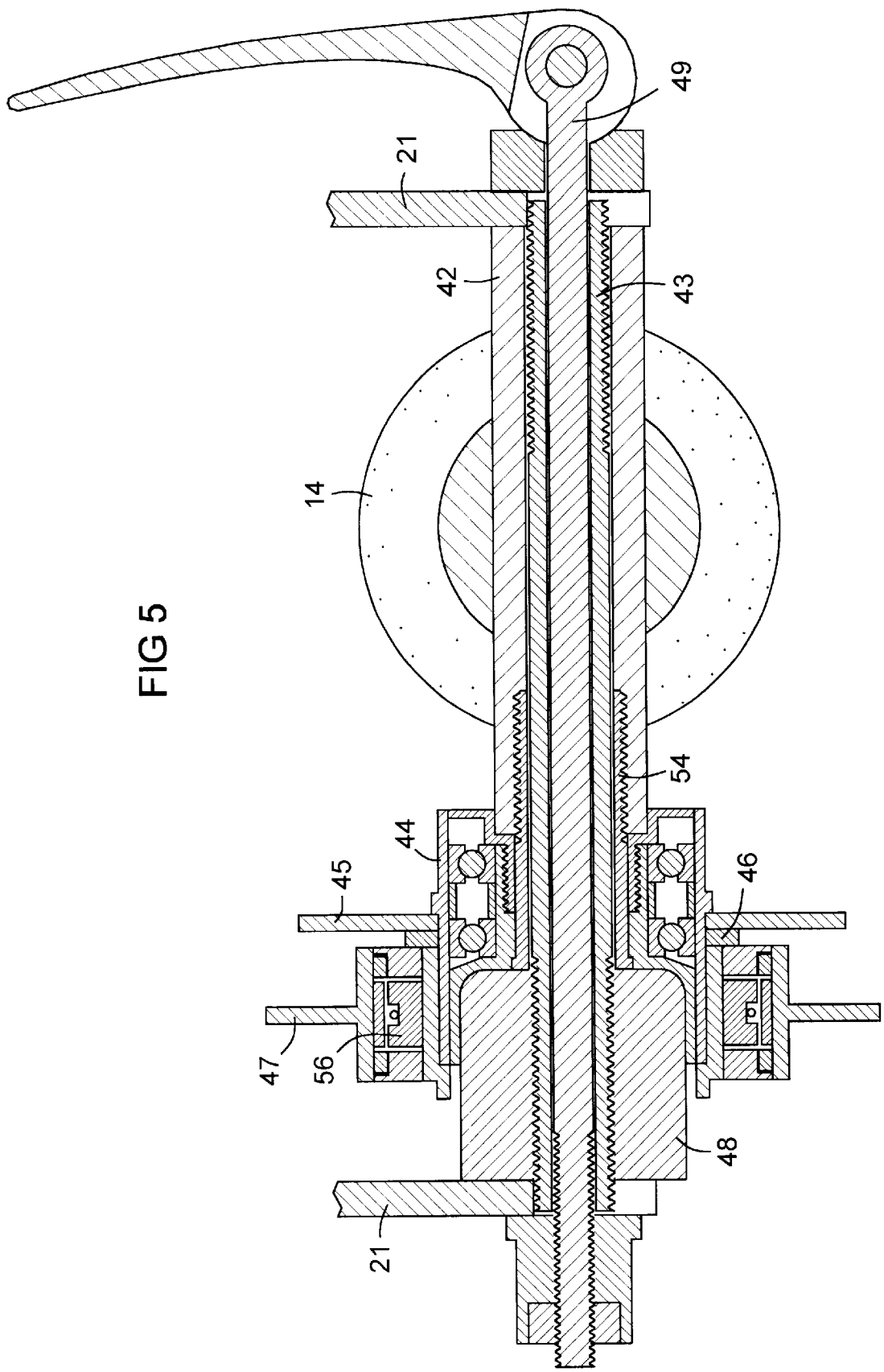
FIG. 5 is a front sectional view of the adapter axle assembly connected between the dropouts of a standard bicycle.
Figure 6:
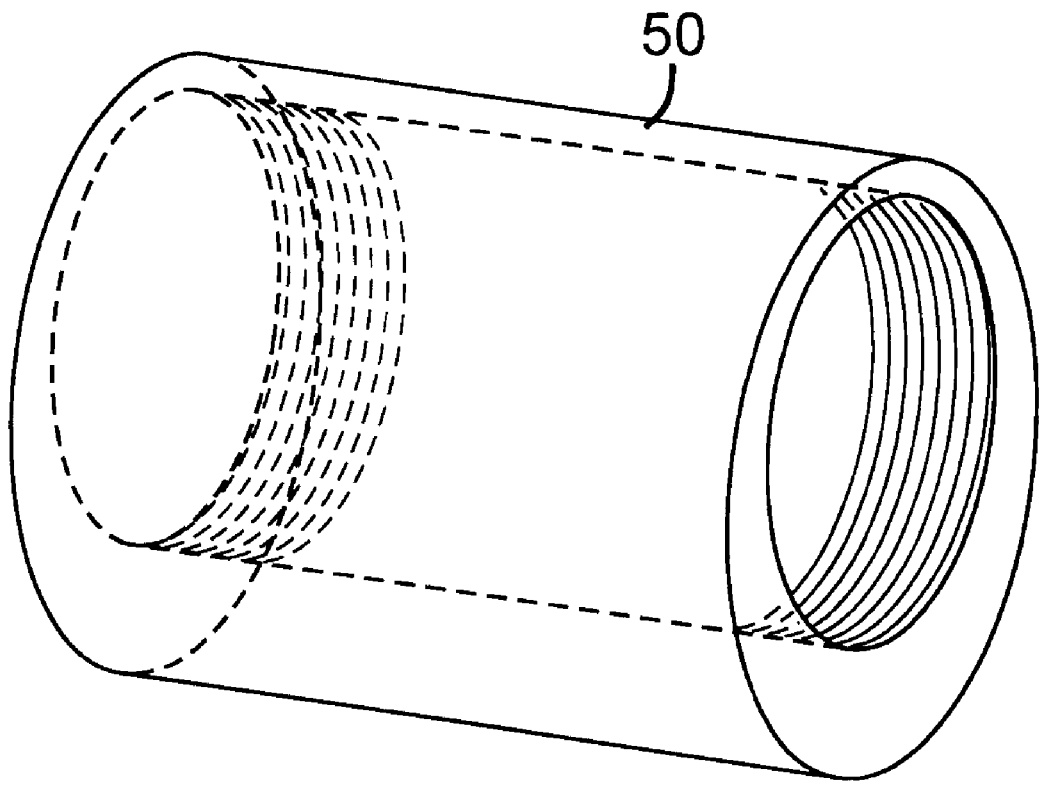
FIG. 6 is perspective transparent view of an eccentric bottom bracket holder for the tandem adapter crankset.
Figure 7:
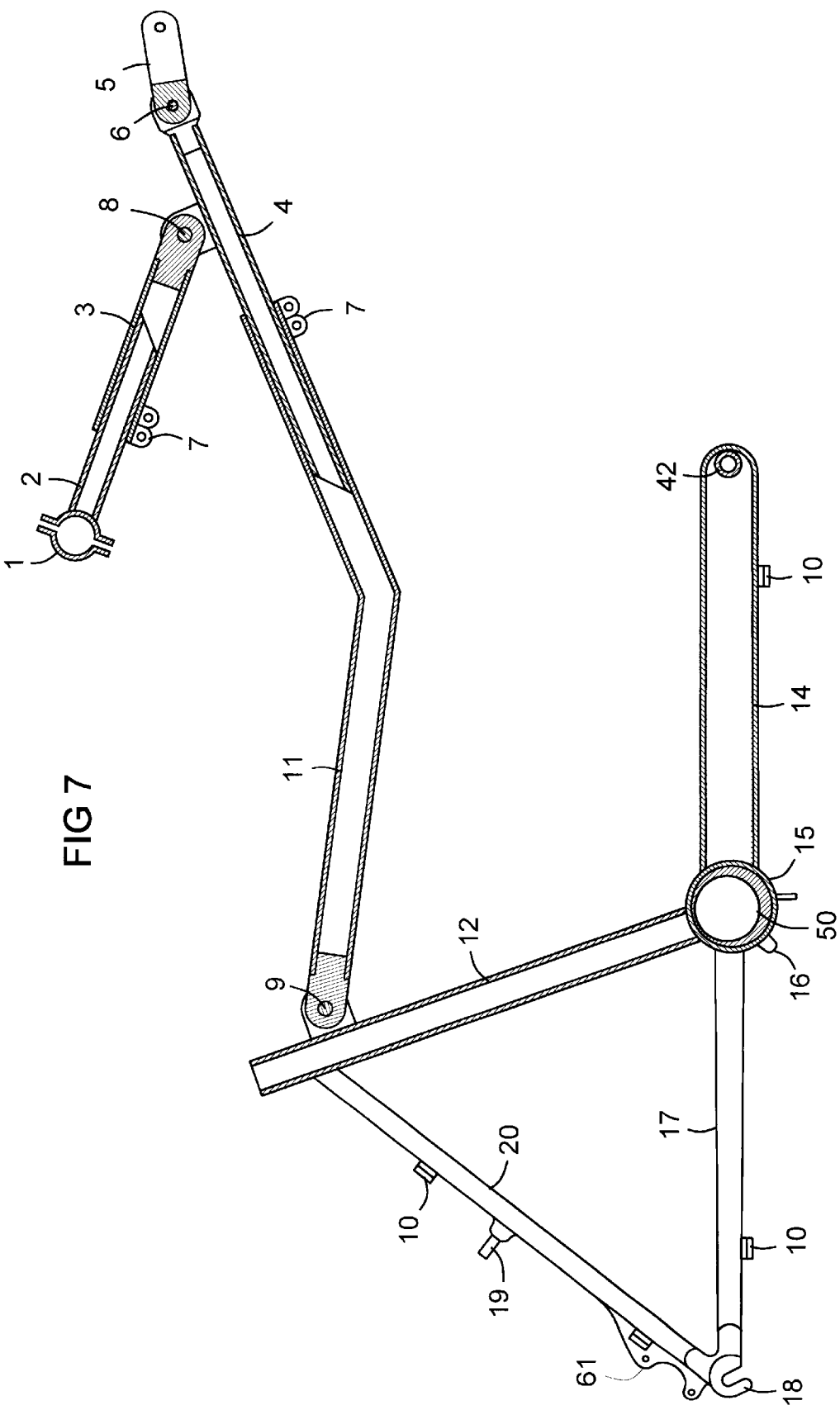
FIG. 7 is a side view of a second embodiment of the tandem adapter frame.

FIG. 4 is an exploded view of the axle assembly 13, and FIG. 5 is a front sectional view of it as installed. An axle assembly housing 42 is attached to the front end of boom tube 14. The axle assembly housing holds a standard hollow bicycle axle horizontally transversely to the boom tube. The axle is attached between the rear drop-outs of the bicycle using a standard quick-release axle fastener 49. The axle assembly housing has interior threads to receive a sprocket hub tightener 54. This tightener attaches a sprocket hub 44 to the axle assembly housing. The sprocket hub rotates about the axle. A fixed sprocket 45 and a sprocket spacer 46 slide onto an external spline on the sprocket hub, and thus rotate with the sprocket hub. A freewheel sprocket 47 threads onto the hub against the sprocket spacer, retaining the fixed sprocket. The freewheel sprocket has a freewheel device 56 as known in the art. This allows the freewheel sprocket to rotate independently of the sprocket hub in one direction of relative rotation between the freewheel sprocket and the hub, and otherwise causes the freewheel sprocket to co-rotate with the hub, driving the hub. This allows the captain to stop pedaling at any time, whether the stoker continues pedaling or not. However, when the captain pedals, the stoker must also pedal.

A standard hollow axle 43 passes through this entire hub assembly. A threaded axle spacer 48 is threaded onto the axle to fill the space between standard dropouts. A quick-release axle fastener 49 has a control rod passing through the hollow axle with a cam lever on one end and an adjustment nut on the other end, as is well known in the art. This quickly and securely connects and disconnects the axle assembly between the dropouts of the bicycle.

The two sprockets 45, 47 on the axle assembly provide transmission of power to the rear crank set 39 and thence to the rear wheel without modifying the captain's drive chain. Transmission of power to the rear wheel 31 from the captain's crank 35 set is achieved via the captain's chain spanning between a sprocket on the captain's crank set and the freewheel sprocket 47 of the axle assembly. The freewheel sprocket thence drives the fixed sprocket 45 via the sprocket hub 44. An axle assembly chain 38 spans between the fixed sprocket of the axle assembly and a first sprocket on the tandem adapter crank set 39. Finally, a tandem adapter chain spans between a second sprocket on the tandem adapter crank set and a final sprocket on the gear cluster 53 of the rear wheel hub.

Control of the tandem adapter brake 30 is maintained by the captain via a tandem adapter brake cable 28 which attaches to the captain's rear brake cable 32 with a cable quick connect 27. Control of the tandem adapter derailleur 41 is maintained by the captain via a tandem adapter derailleur cable 37 which attaches to the captain's rear derailleur cable 51 with another cable quick connect 27.

Figure six is an eccentric bottom bracket holder 50. This is a cylinder that fits into the bottom bracket shell 15 of the adapter frame, and is tightened in place by a set screw 16. The eccentric bottom bracket holder is traversed by an off-center hole with threads at both ends. This threaded hole accepts the tandem adapter crank set 39. The eccentric mounting of the crank set provides fine tension adjustment of the axle assembly chain 38 between the axle assembly 13 and the tandem adapter crank set 39. The eccentric bottom bracket holder is turned until a desired chain tension is achieved, then the setscrew is tightened.

A seat post clamp 5 is attached to the front end of the top tube 4 of the tandem adapter frame by a pivot connection 6. It preferably has a quick-release cam lever or other quick clamping mechanism as known in the art for fast, secure attachment to the captain's seat post 33. However, it can be simply a piece of tubing with a slit cut in one side that allows the tubing to compress onto the captain's seat post 33 via pinch bolts on tension bands.

A standard bicycle is initially configured by a bicycle mechanic for use with the tandem adapter. This includes installing quick connectors on the rear brake cable and derailleur cable. Also a dummy derailleur cable is installed on the captain's bike to hold the captain's derailleur over the freewheel sprocket of the axle assembly when the captain's derailleur cable is connected to the tandem adapter derailleur cable. After these modifications are made, subsequent conversions to and from a tandem bicycle are easily done by a user without tools.

Operation

1. User removes rear wheel 31 of single-rider bicycle.
2. User installs rear wheel 31 of the captain's bicycle in the rear dropouts 18 of the tandem adapter.
3. The axle assembly 13 of the tandem adapter fits into the captain's rear dropouts 21 from which the rear wheel 31 was removed. The user secures this connection by compression achieved by an industry standard quick release axle fastener 49.
4. User attaches the captain's seat post clamp 5 to the captain's seat post 33.
5. The top tube assembly telescopes and pivots to fit a variety of frames. It is adjusted so that the captain's crank set 35, the captain's rear drop outs 21, the axle assembly 13, and the tandem adapter crank set 39 are all in a straight line parallel to the ground. Then pinch bolts 7 on the top tube assembly are tightened to lock the adjusted frame geometry.
6. The tension of the chain between the tandem adapter crank set 39 and the axle assembly 13 is adjusted by rotating the eccentric bottom bracket holder 50 in the bottom bracket shell 15. Once the desired tension is achieved, the eccentric bottom bracket holder 50 is locked in place with a setscrew 16.
7. Transmission of power to the rear wheel 31 from the captain's crank set 35 is achieved by placing the captain's chain 34 on the free wheel sprocket 47 of the axle assembly 13. The free wheel sprocket 47 drives the fixed sprocket 45 via the sprocket hub 44. This drives the axle assembly chain 38, which drives the tandem adapter crank set 39, which drives the tandem adapter chain 40, which drives the gear cluster 53.
8. The captain maintains control of the tandem adapter brake 30. A cable quick-connect coupling 27 is installed on the captain's rear brake cable 32 in front of the captain's seat tube 12. The captain's rear brake cable 32 is separated at this coupling, and re-coupled to the tandem adapter brake cable 28. The tandem adapter brake cable is routed along the top tube assembly and the seat stays 20 through cable stops 10 and attaches to the tandem adapter brake 30.
9. Control of the rear derailleur on the tandem adapter and the ability to change gears is maintained by the captain. A cable quick-connect coupling 27 is installed in the captain's derailleur cable 51. The captain's rear derailleur cable 51 is separated at this coupling and re-coupled to the tandem adapter derailleur cable 37. If the captain's rear derailleur cable 51 is routed along the top tube 57 of the captain's bike, it continues along the top tube assembly of the tandem adapter and down the seat stays 20 of the adapter frame to the tandem adapter derailleur 41. If the captain's rear derailleur cable is routed along the down tube 58 and chain stay 59 of the captain's bike, it continues along the boom tube 14 and chain stay 17 of the tandem adapter to the tandem adapter derailleur 41 through cable stops 10.
10. The Captain's derailleur 36 is held in place over the free wheel sprocket 47 by connecting the end of the captain's derailleur cable to the dummy cable that was installed on the bike in the set-up process.
11. The riding position of the stoker is adjusted by moving the telescoping handle bar stem 2 in or out, pivoting the handlebar stem 3, and by adjusting the tandem adapter seat post 55 up or down.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

We claim:

1. A tandem bicycle adapter for use with a bicycle comprising a frame having a crank set with a first drive sprocket, a rear fork having two laterally opposed rear wheel axle mounting plates, or dropouts; a first axle mounted between the dropouts on the bicycle; a rear wheel and final drive sprocket mounted on the axle, a first drive chain spanning between the first drive sprocket and the final drive sprocket on the bicycle, and a seat post; the tandem bicycle adapter comprising:

an adapter frame having front and back ends, lower and upper levels;

an elongated generally horizontal boom on the lower level of the adapter frame having front and back ends;

an adapter axle assembly on the front end of the boom that holds a second axle horizontally transversely to the boom;

a sprocket hub rotatably mounted on the adapter axle assembly, with a fixed sprocket that rotates with the sprocket, hub and a freewheel sprocket that rotates independently of the sprocket hub in one direction of rotation relative to the sprocket hub, and otherwise co-rotates with the sprocket hub, driving the sprocket hub and fixed sprocket;

an adapter crank set on the back end of the boom with a crank axle, a crank, and foot pedals;

first and second sprockets fixed to the adapter crank set axle;

an axle assembly chain that spans between the fixed sprocket of the adapter axle assembly and the first sprocket of the adapter crank set;

a wheel fork on the back end of the adapter frame, having two laterally opposed wheel axle mounting plates, or dropouts;

a seat on the upper level of the adapter frame;

a top tube assembly on the adapter frame, having a top tube extending to the upper front end of the adapter frame, the top tube having a front end with a seat post clamp for releasable attachment to the seat post of the bicycle;

a handle bar on the top tube assembly of the adapter frame for a rider in the seat on the adapter frame.

2. The tandem bicycle adapter of claim 1, wherein the rear wheel and axle of the bicycle is removed from the bicycle and mounted between the dropouts of the adapter frame; the adapter axle assembly is mounted between the rear dropouts of the bicycle in place of the rear wheel; the first drive chain of the bicycle is trained around the freewheel sprocket of the adapter axle assembly; a final drive chain spans between the second sprocket of the adapter crank set and the final drive sprocket mounted on the adapter frame, and the seat post clamp is clamped to the seat post of the bicycle.

3. A tandem adapter for use in combination with a bicycle comprising a frame with front and back ends, upper and lower levels, two laterally opposed rear wheel axle mounting plates on the lower back end of the bicycle frame, a first axle mounted between the axle mounting plates on the bicycle frame, a rear wheel mounted on the first axle, a final drive sprocket on the rear wheel, a seat post on the upper level of the bicycle frame, a first crank on the bicycle frame with foot pedals and a first drive sprocket, a first drive chain that spans between the first drive sprocket and the final drive sprocket on the bicycle; the tandem adapter comprising:

an adapter frame with front and back ends, upper and lower levels;

two laterally opposed bicycle wheel axle mounting plates on the lower back end of the adapter frame for receiving the first axle and rear wheel removed from the bicycle;

an adapter axle assembly on the lower front end of the adapter frame that holds a second axle horizontally in a transverse orientation relative to the adapter frame for mounting between the rear wheel axle mounting plates of the bicycle;

a top tube assembly on the adapter frame having a top tube extending to the upper front end of the adapter frame;

a releasable bicycle seat post clamp on the upper front end of the top tube for connection to the seat post of the bicycle;

a seat on the top level of the adapter frame;

a handlebar stem on the top tube assembly forward of the seat on the adapter frame;

second and third drive sprockets on the adapter axle assembly that are rotationally fixed to each other in at least one direction of rotation relative to each other;

the first chain removed from the final drive sprocket and placed on the second drive sprocket, spanning between the first and second drive sprockets;

a second crank with foot pedals and fourth and fifth drive sprockets on the adapter frame;

a second drive chain that spans between the third and fourth sprockets; and a third drive chain that spans between the fourth and final drive sprockets.

4. The tandem bicycle adapter of claim 3, further including a freewheel mechanism in the adapter axle assembly that allows the second and third sprockets to rotate independently of each other in one direction of rotation relative to each other, and otherwise causes them to co-rotate.

5. The tandem bicycle adapter of claim 3, further comprising:

a bottom bracket shell on the adapter frame between the adapter axle assembly and the axle mounting plates of the adapter frame, having a cylindrical hole with a transverse orientation relative to the adapter frame;

an eccentric bottom bracket holder in the bottom bracket shell on the adapter frame, formed generally as a cylinder matching the hole in the bottom bracket shell on the adapter frame, and having a cylindrical hole with an axis that is parallel to, and offset from, the axis of the cylinder of the eccentric bottom bracket holder;

a boom tube that spans between the bottom bracket shell on the adapter frame and the adapter axle assembly;

a seat tube with a bottom end attached to the bottom bracket shell on the adapter frame;

wherein the second crank is mounted in the eccentric bottom bracket holder, and wherein the top tube assembly is pivotally attached to the adapter frame at one or more points on the seat tube, the bottom bracket shell, and the boom tube, and wherein the top tube has adjustable length.

* * * * *